United States Patent
Wakizaka et al.

(10) Patent No.: US 9,368,796 B2
(45) Date of Patent: Jun. 14, 2016

(54) GRAPHITE MATERIAL, CARBON MATERIAL FOR BATTERY ELECTRODE, AND BATTERY

(71) Applicant: SHOWA DENKO K.K., Minato-ku, Tokyo (JP)

(72) Inventors: Yasuaki Wakizaka, Tokyo (JP); Yuuichi Kamijou, Tokyo (JP); Masataka Takeuchi, Tokyo (JP); Takayuki Fukai, Tokyo (JP); Chiaki Sotowa, Tokyo (JP); Akinori Sudoh, Tokyo (JP); Masako Tanaka, Tokyo (JP)

(73) Assignee: SHOW A DENKO K.K., Tokyo (JP)

( * ) Notice: Subject to any disclaimer, the term of this patent is extended or adjusted under 35 U.S.C. 154(b) by 0 days.

(21) Appl. No.: 14/353,092

(22) PCT Filed: Oct. 19, 2012

(86) PCT No.: PCT/JP2012/077039
§ 371 (c)(1),
(2) Date: Apr. 21, 2014

(87) PCT Pub. No.: WO2013/058349
PCT Pub. Date: Apr. 25, 2013

(65) Prior Publication Data
US 2014/0335428 A1 Nov. 13, 2014

(30) Foreign Application Priority Data
Oct. 21, 2011 (JP) .................. 2011-232308

(51) Int. Cl.
*C01B 31/04* (2006.01)
*H01M 4/587* (2010.01)
(Continued)

(52) U.S. Cl.
CPC ............... *H01M 4/587* (2013.01); *C01B 31/04* (2013.01); *H01M 4/364* (2013.01); *H01M 4/583* (2013.01);
(Continued)

(58) Field of Classification Search
CPC ..... H01M 4/587; H01M 4/583; H01M 4/364; H01M 10/0525; H01M 10/0569; H01M 2200/20; H01M 2300/0028; H01M 2004/021; Y02E 60/122; C01B 31/04
USPC .................. 427/249.6; 428/314.2; 429/231.4
See application file for complete search history.

(56) References Cited

U.S. PATENT DOCUMENTS 5,587,255 A 12/1996 Sonobe et al.
6,632,569 B1 10/2003 Kameda et al.
(Continued)

FOREIGN PATENT DOCUMENTS

CA 2 778 407 A1 5/2011
EP 0 918 040 B1 1/2003
(Continued)

OTHER PUBLICATIONS

International Search Report for PCT/JP2012/077039 dated Jan. 8, 2013.

*Primary Examiner* — Ula C Ruddock
*Assistant Examiner* — Lisa S Park
(74) *Attorney, Agent, or Firm* — Sughrue Mion, PLLC

(57) ABSTRACT

A graphite material having pores which, when 200 rectangular regions of 6 μm×8 μm are randomly selected in a surface image of the graphite material observed by a scanning electron microscope, in the surface of the graphite material appearing in the regions, a pore appearing on the surface and having an aperture in a shape having a diameter of 15 nm to 200 nm, a circularity degree of 0.75 to 1.0 and a major axis/minor axis ratio of 1.0 to 1.5 is visible in two regions or more. Also disclosed is a carbon material for battery electrodes, a paste for electrodes, an electrode and a lithium ion secondary battery including the graphite material.

17 Claims, 2 Drawing Sheets

(51) Int. Cl.
  *H01M 4/583*     (2010.01)
  *H01M 4/36*      (2006.01)
  *H01M 10/0525*   (2010.01)
  *H01M 10/0569*   (2010.01)
  *H01M 4/02*      (2006.01)

(52) U.S. Cl.
  CPC ...... *H01M 10/0525* (2013.01); *H01M 10/0569* (2013.01); *H01M 2004/021* (2013.01); *H01M 2220/20* (2013.01); *H01M 2300/0028* (2013.01); *Y02E 60/122* (2013.01)

(56) References Cited

U.S. PATENT DOCUMENTS

| | | |
|---|---|---|
| 2002/0132159 A1 | 9/2002 | Ohya et al. |
| 2008/0274404 A1* | 11/2008 | Ishii et al. .................. 429/217 |
| 2008/0274406 A1* | 11/2008 | Fuse et al. ................. 429/231.4 |
| 2008/0305319 A1* | 12/2008 | Nishiwaki et al. ............ 428/222 |
| 2009/0080142 A1 | 3/2009 | Nanba et al. |
| 2009/0196816 A1* | 8/2009 | Yamamoto et al. ........... 423/448 |
| 2009/0269669 A1* | 10/2009 | Kim et al. .................. 429/231.8 |
| 2012/0045642 A1 | 2/2012 | Nishimura et al. |

FOREIGN PATENT DOCUMENTS

| | | |
|---|---|---|
| EP | 2 418 172 A1 | 2/2012 |
| JP | 2-122828 A | 5/1990 |
| JP | 4-190555 A | 7/1992 |
| JP | 7-320740 A | 12/1995 |
| JP | 11-219700 A | 8/1999 |
| JP | 2002-170574 A | 6/2002 |
| JP | 3361510 B2 | 1/2003 |
| JP | 2003-077534 A | 3/2003 |
| JP | 2003-128409 A | 5/2003 |
| JP | 3534391 B2 | 6/2004 |
| JP | 2005-166325 A | 6/2005 |
| JP | 2007-186403 A | 7/2007 |
| JP | 2011-173109 A | 9/2011 |
| JP | 2011-184293 A | 9/2011 |
| WO | 2011/049199 A1 | 4/2011 |
| WO | 2011/052452 A1 | 5/2011 |
| WO | 2011/093254 A1 | 8/2011 |

* cited by examiner

GRAPHITE MATERIAL, CARBON MATERIAL FOR BATTERY ELECTRODE, AND BATTERY

CROSS REFERENCE TO RELATED APPLICATIONS

This application is a National Stage of International Application No. PCT/JP2012/077039, filed Oct. 19, 2012, claiming priority from Japanese Patent Application No. 2011-232308, filed Oct. 21, 2011, the contents of all of which are incorporated herein by reference in their entirety.

TECHNICAL FIELD

The present invention relates to a graphite material, a carbon material for a battery electrode, and a battery. More specifically, the present invention relates to a graphite material which is suitable as an electrode material for a non-aqueous electrolyte secondary battery; a carbon material for a battery electrode; and a secondary battery excellent in charge/discharge cycle characteristics and large current load characteristics.

BACKGROUND ART

As a power source of a mobile device, or the like, a lithium ion secondary battery is mainly used. The function of the mobile device or the like is diversified, resulting in increasing in power consumption thereof. Therefore, a lithium ion secondary battery is required to have an increased battery capacity and, simultaneously, to have an enhanced charge/discharge cycle characteristic.

Further, there is an increasing demand for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a driving range (distance), which are severe as compared to mobile applications.

In the lithium ion secondary battery, generally, a lithium salt, such as lithium cobaltate, is used as a positive electrode active material, and a carbonaceous material, such as graphite, is used as a negative electrode active material.

Graphite is classified into natural graphite and artificial graphite.

Among those, natural graphite is available at a low cost. However, as natural graphite has a scale shape, if natural graphite is formed into a paste together with a binder and applied to a collector, natural graphite is aligned in one direction. When an electrode made of such a material is charged, the electrode expands only in one direction, which degrades the performance of the electrode. Natural graphite, which has been granulated and formed into a spherical shape, is proposed, however, the resulting spherical natural graphite is aligned because of being crushed by pressing in the course of electrode production. Further, the surface of the natural graphite is active, and hence a large amount of gas is generated during initial charging, which decreases an initial efficiency and degrades a cycle characteristic. In order to solve those problems, Japanese Patent publication No. 3534391 (U.S. Pat. No. 6,632,569, Patent Document 1), etc. propose a method involving coating artificial carbon on the surface of the natural graphite processed into a spherical shape.

Regarding artificial graphite, there is exemplified a mesocarbon microsphere-graphitized article described in JP 04-190555 A (Patent Document 2) and the like.

Artificial graphite typified by graphitized articles made of oil, coal pitch, coke and the like is available at a relatively low cost. However, a satisfactory crystalline needle-shaped coke tends to align in a scale shape. In order to solve this problem, the method described in Japanese patent publication No. 3361510 (European Patent No. 0918040; Patent Document 3) and the like yield results.

Further, negative electrode materials using so-called hard carbon and amorphous carbon described in JP 07-320740 A (U.S. Pat. No. 5,587,255; Patent Document 4) are excellent in a characteristic with respect to a large current and also have a relatively satisfactory cycle characteristic.

In JP-A-2003-77534 (Patent Document 5), studies have been made on a graphite material having a relatively high porosity for the purpose of rapid charge and discharge.

In WO 2011/052452 (Canadian Patent No. 2,778,407; Patent Document 6), studies have been made on carbon particles having a low porosity.

WO2011/049199 (U.S. Patent Publication No. 2012/045642; Patent Document 7) discloses artificial graphite being excellent in cycle characteristics.

PRIOR ART

Patent Documents

Patent Document 1: JP 3534391 B2 (U.S. Pat. No. 6,632,569)
Patent Document 2: JP 04-190555 A
Patent Document 3: JP 3361510 B2 (European Patent No. 0918040)
Patent Document 4: JP 07-320740 A (U.S. Pat. No. 5,587,255)
Patent Document 5: JP 2003-77534 A
Patent Document 6: WO 2011/052452 (Canadian Patent No. 2,778,407)
Patent Document 7: WO 2011/049199 (U.S. Patent Publication No. 2012/045642)

DISCLOSURE OF THE INVENTION

Problems to be Solved by the Invention

The material produced by the method described in Patent Document 1 can address a high-capacity, a low-current, and an intermediate-cycle characteristic required by the mobile applications, etc. However, it is very difficult for the material to satisfy the requests such as a large current and an ultralong-term cycle characteristic of a large battery as described above.

The graphitized article described in Patent Document 2 is a well-balanced negative electrode material, and is capable of producing a battery with a high capacity and a large current. However, it is difficult to achieve the cycle characteristic for a much longer period of time than the one for mobile applications, which are required for a large battery.

The method according to Patent Document 3 can allow the use of not only fine powder of an artificial graphite material but also fine powder of a natural graphite, or the like, and exhibits very excellent performance for a negative electrode material for the mobile applications. This material can address the high-capacity, the low-current, and the intermediate cycle characteristic required for the mobile applications, etc. However, this material has not satisfied requests such as a large current and an ultralong-term cycle characteristic of a large battery as described above.

The volume energy density of the negative electrode material described in Patent Document 4 is too low and the price of the material is very expensive, and thus, such negative electrode materials are only used for some special large batteries.

In Patent Document 5, the capacity retention at the time of charge and discharge is not sufficient for actual use in secondary batteries.

Patent Document 6 has a problem in cycle characteristics and in that the battery cannot attain a sufficient capacitance, particularly when discharge is carried out at a higher rate.

In Patent Document 7, the graphite has a high texture density and there was room for improvement on the ion diffusion of the active substance.

Accordingly, an objective of the present invention is to provide a graphite material which is suitable for a carbon material for negative electrodes in lithium ion secondary batteries and the like, which enables the production of electrodes that have a high energy density, while maintaining ultra-long cycle characteristics and large current load characteristics required for large batteries at high levels. Another objective of the present invention is to provide the graphite material at an inexpensive price.

Means to Solve the Problem

[1] A graphite material having pores, wherein the aperture of the pore is in a shape having a diameter of 15 nm to 200 nm, a circularity degree of 0.75 to 1.0 and the major axis/minor axis ratio of 1.0 to 1.5.

[2] The graphite material as described in [1] above, when 200 rectangular regions of 6 µm×8 µm are randomly selected in the surface image of the graphite material observed by a scanning electron microscope, in the surface of the graphite material appearing in the regions, a pore appearing on the surface and having an aperture in a shape having a diameter of 15 nm to 200 nm, a circularity degree of 0.75 to 1.0 and the major axis/minor axis ratio of 1.0 to 1.5 is visible in two regions or more.

[3] The graphite material as described in [1] or [2] above, wherein the pore is cylindrical.

[4] The graphite material as described in any one of [1] to [3] above, satisfying the following conditions (a) and (b):
 (a) the total pore volume measured by mercury intrusion technique is 0.35 cm$^3$/g to 0.65 cm$^3$/g;
 (b) the accumulated volume of the pores having a diameter of 3 µm or less measured by mercury intrusion technique is 0.18 cm$^3$/g to 0.60 cm$^3$/g.

[5] The graphite material as described in [4] above, wherein, when the specific surface area measured by mercury intrusion technique and the specific surface area measured by a BET method are described as SHG and SBET, respectively, SBET/SHG is 0.65 to 1.5.

[6] The graphite material as described in [4] or [5] above, wherein, when an average particle diameter based on a volume measured in a solvent using a laser diffraction type particle size distribution analyzer is described as D50 and an average pore diameter measured by mercury intrusion technique is described as $P_{DAVE}$, D50/$P_{DAVE}$ is 1.5 to 13.

[7] The graphite material as described in any one of [1] to [6] above, wherein the BET specific surface area is 0.4 m$^2$/g to 5 m$^2$/g.

[8] The graphite material as described in any one of [1] to [7] above, wherein the average particle diameter based on a volume (D50) measured in a solvent using a laser diffraction type particle size distribution analyzer is 3 µm to 30 µm.

[9] The graphite material as described in any one of [1] to [8] above, wherein an average interplanar spacing $d_{002}$ of plane (002) is 0.3356 nm to 0.3375 nm measured by the powder X-ray diffraction method and the intensity ratio $I_D/I_G$ (R value) between the peak intensity ($I_D$) in a range of 1300 to 1400 cm$^{-1}$ and the peak intensity ($I_G$) in a range of 1580 to 1620 cm$^{-1}$ as measured by Raman spectroscopy spectra is 0.05 or higher.

[10] A carbon material for battery electrodes comprising the graphite material described in any one of [1] to [9] above.

[11] The carbon material for battery electrodes as described in [10] above, comprising 100 parts by mass of the graphite material described in any one of [1] to [9] above and 0.01 to 200 parts by mass of natural or artificial graphite having an average interplanar spacing (d002) of 0.3370 nm or less.

[12] The carbon material for battery electrodes as described in [10] above, comprising 100 parts by mass of the graphite material described in any one of [1] to [9] above and 0.01 to 120 parts by mass of spherical natural graphite or artificial graphite having an average interplanar spacing (d002) of 0.3370 or less and an aspect ratio of 2 to 100.

[13] A paste for electrodes comprising the carbon material for battery electrodes described in any one of [10] to [12] above and a binder.

[14] An electrode comprising a molded body of the paste for electrodes described in [13] above.

[15] A battery comprising the electrode as described in [14] above as a constituent.

[16] A lithium ion secondary battery comprising the electrode described in [14] above as a constituent.

[17] The lithium ion secondary battery as described in [16] above, comprising non-aqueous electrolyte and/or non-aqueous polymer electrolyte, wherein the non-aqueous solvent used for the non-aqueous electrolyte and/or non-aqueous polymer electrolyte is at least one member selected from the group consisting of ethylene carbonate, diethyl carbonate, dimethyl carbonate, methyl ethyl carbonate, propylene carbonate, butylene carbonate, γ-butyrolactone and vinylene carbonate.

Effects of the Invention

Using the above-mentioned graphite carbon composite material as the carbon material for the battery electrode improves the diffusion of lithium ions, and therefore a battery electrode capable of maintaining the high capacity, the high coulomb efficiency and the high cycle characteristics while having a high energy density and capable of fast charge and discharge can be obtained.

Further, the graphite carbon material of the present invention can be produced by the method excellent in economic efficiency and mass productivity with safety improved.

MODE FOR CARRYING OUT THE INVENTION

Figure 1:
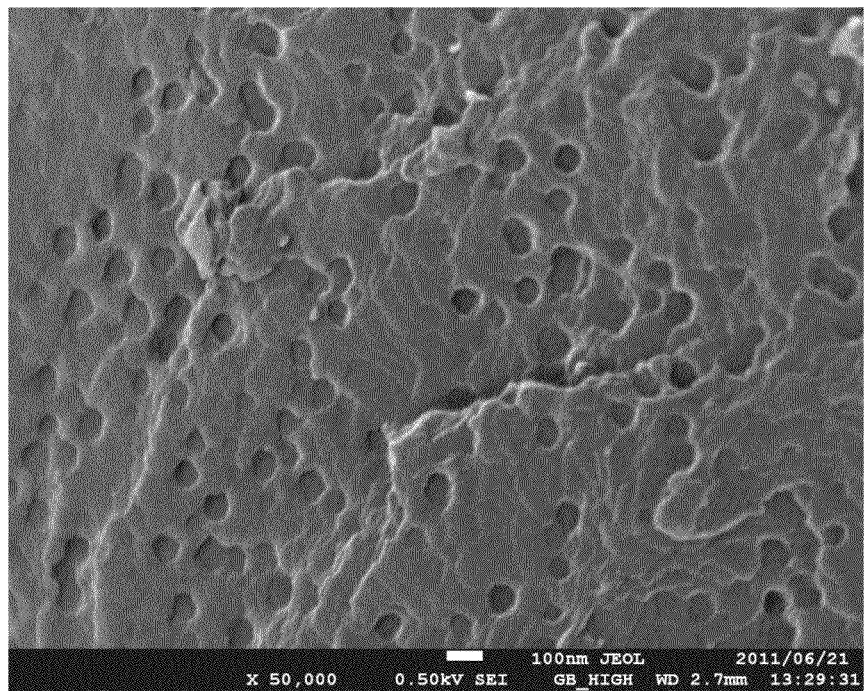
[FIG. 1] An electron microscope image of the graphite material in Example 1

An embodiment of the present invention is described in details below.

[Graphite Material]

The graphite material of the present invention has pores, wherein the pore has an opening shape with a diameter of 15 nm to 200 nm, a circularity degree of 0.75 to 1.0 and the major axis/minor axis ratio of 1.0 to 1.5. The pore preferably has a cylindrical shape. Due to the presence of such pores, a discharge capacity can be retained even when charge and discharge are carried out at a higher current.

When the diameter of the pore aperture is within the above-mentioned range, a sufficient volume is secured for lithium ions to diffuse, resulting in good characteristics of the negative electrode for lithium ion secondary batteries, which is preferable. More preferably, the diameter is 15 nm to 150 nm.

When the degree of circularity is within the above-mentioned range, lithium ions are smoothly supplied through the voids between the particles of the negative electrode active substance at the time of charge and discharge, which is preferable. More preferably, the degree of circularity is 0.75 to 1.0 and still more preferably 0.8 to 1.0. The degree of circularity can be expressed as $4\pi S/L^2$ when the area and the perimeter of the object figure are described as S ($m^2$) and L (m), respectively.

Then the major axis/minor axis is within the above-mentioned range, lithium ions are smoothly supplied through the voids between the particles of the negative electrode active substance at the time of charge and discharge, resulting in good charge/discharge characteristics when the graphite material is made into a battery, which is preferable. The ratio of the major axis/minor axis is more preferably 1.0 to 1.4 and still more preferably 1.0 to 1.3.

The diameter, degree of circularity and ratio of the major axis/minor axis can be calculated by observing the surface image of a graphite material with a scanning electron image (SEM) and analyzing the image (for example, by using the image analysis software ImageJ produced by NIH).

When 200 rectangular regions of 6 μm×8 μm are randomly selected in the surface image of the graphite material observed with a scanning electron microscope (SEM), in the surface of the graphite material appearing in the regions, a pore mentioned above appearing on the surface is visible preferably in two regions or more (visually recognized rate of 1% or more). More preferably, such a pore is visible in three regions or more (visual check rate of 1.5% or more). When the number of the regions in which a pore mentioned above is visible is small, the improvement of physical properties based on the pores may not be sufficient in some cases.

A rectangular region of 6 μm×8 μm corresponds to one field of view when observed with an SEM (field-emission scanning type, wavelength dispersion of about 3 to 4 mm, accelerating voltage of 0.5 keV, secondary electron image, GB:high, 15,000-fold magnification).

Not all the pores may be regular in shape. Therefore, when ten pores having a diameter of 15 nm to 200 nm are observed, it is preferable that five or more pores meet the above-mentioned conditions for the roundness and the major axis/minor axis ratio.

The graphite material in a preferred embodiment of the present invention satisfies the following conditions (a) and (b):

(a) the total pore volume measured by mercury intrusion technique is 0.35 $cm^3/g$ to 0.65 $cm^3/g$;

(b) the accumulated volume of the pores having a diameter of 3 μm or less measured by mercury intrusion technique is 0.18 $cm^3/g$ to 0.60 $cm^3/g$.

The above-mentioned total pore volume is preferably 0.36 $cm^3/g$ to 0.60 $cm^3/g$, more preferably 0.37 $cm^3/g$ to 0.55 $cm^3/g$. By setting the total pore volume within the above-mentioned range, sufficient diffusion of lithium ions in a negative electrode material can be attained and at the same time the density of the active substance in the electrode is increased when the graphite material is used as a negative electrode for a lithium ion secondary battery, which is preferable.

The accumulated pore volume of the pores having a diameter of 3 μm or less is preferably 0.19 $cm^3/g$ to 0.5 $cm^3/g$ and more preferably 0.20 $cm^3/g$ to 0.45 $cm^3/g$. By setting the accumulated pore volume within the above-mentioned range, the diffusion of lithium ions can be efficiently improved in comparison to the pore volume. Further, it is preferable that the volume of the pores of 3 μm or less is large so as to prevent decrease in the electrode density and to increase the energy density.

By designing both of the total pore volume and accumulated pore volume of the pores having a diameter of 3 μm or less to meet the value within the above-mentioned range, the shape of the pores become optimal for the diffusion of lithium ions, and as a result enables the production of batteries which is capable of fast charge and discharge while can attain a high energy density.

When the total pore volume meets a value within the above-mentioned range while the accumulated pore volume of the pores having a diameter of 3 μm or less does not, the diffusion of lithium ions becomes insufficient in some cases. If the diffusion of lithium ions becomes insufficient, it could have some impact on the charge and discharge rate. To the contrary, when the accumulated pore volume of the pores having a diameter of 3 μm or less meets a value within the above-mentioned range while the total pore volume does not, the energy density tends to decrease due to the presence of excessive pores.

In the present specification, various properties by mercury intrusion technique can be measured and evaluated by the method as described below.

A sample (powder) is accurately weighed out within a range of 0.25±0.02 g per sample to determine the mercury intrusion volume per gram. The measurement is carried out while the pressure is on the increase: i.e. at the time of mercury intrusion, and the amount of the mercury intruded into the sample along with the increased pressure is measured.

As an approximate formula that describes the relationship between the pore radius and pressure, a commonly-employed formula "radius R=0.75 μm/P (P: pressure (MPa))" is used to determine the pore distribution and the pore volume based on the volume of the mercury intruded into the sample. Also, the pore volume in each range of the pore diameter is calculated and the accumulated pore volume of the pores having a diameter of 3 μm or less is computed by a cumulative method. The specific surface area (SHG) is calculated from the results of the obtained pore distribution and the pore volume.

As an apparatus for the mercury intrusion method, Pascal 140 and 440 (produced by CARLO ERBA INSTRUMENTS) are used. The measurement range is to be from 0.3 kPa to 400 kPa (Pascal 140).

When the specific surface area measured by mercury intrusion technique and the specific surface area measured by a BET method are described as SHG and SBET, respectively, it is preferable that the SBET/SHG value of the graphite material in an embodiment of the present invention satisfies the condition of being 0.65 to 1.5. The SBET/SHG value is more preferably 0.8 to 1.3.

The BET specific surface area (SBET) is measured by a common method of measuring the adsorption and desorption amount of the gas per unit mass. As a measurement device, for example, NOVA-1200 can be used.

In the graphite material of the preferred embodiment of the present invention, the specific surface area value (SHG) measured by the mercury intrusion technique in advance is close to the specific surface area value calculated by the BET method (SBET). Since the pores are approximated by the cylinders in the calculation of the SHG values, the fact that the SHG value is close to the SBET value means that the pores have a nearly cylindrical shape. At least, the pores are not in a shape like a crevasse or a sake bottle which is different from a cylindrical shape.

The pores as set forth above are considered to be advantageous for the diffusion of the lithium ions which are consumed and generated in the graphite along with the charge and discharge of lithium ion batteries. The graphite having such pores enables setting the charge and discharge at a high rate compared to the graphite having no pores or pores having a different shape, and is very useful as an electrode active substance. Of course, if the pores are excessively present in the electrode active substance, it leads to the decrease in the electrode density. Therefore, it is preferable that the pore volume satisfies the conditions of (a) and (b) set forth above.

It is also preferable for the graphite to have the specific pores as described above from the viewpoint of the permeability of the electrolyte. Although the mechanism of the pores that contributes to the infiltration of the electrolyte is not clearly known, the infiltration of the electrolyte is significantly faster and is definitely caused when the particles having the specific pores as mentioned above are contained in an amount of 3 mass % or more in the graphite material when the electrode is put under pressure and returned to normal pressure. The fast infiltration of the electrolyte can shorten the process of impregnating the electrolyte into the electrode, which enables efficient production of batteries. Similarly, when the particles having the specific pores as mentioned above are contained in an amount of 6 mass % or more in the graphite material, it ensures that the electrolyte penetrates into the electrode and enables efficiently use of all of the active substance contained in the electrode.

When an average particle diameter based on a volume measured in a solvent using a laser diffraction type particle size distribution analyzer is described as D50 and an average pore diameter measured by mercury intrusion technique is described as $P_{DAVE}$, it is preferable that $D50/P_{DAVE}$ meets the condition of 1.5 to 13.

$D50/P_{DAVE}$ is preferably 1.75 to 10, and more preferably 2.0 to 7. By setting $D_{50}/P_{DAVE}$ in the above-mentioned range, a high performance electrode having an appropriate porous structure in which just enough pores are present, and being excellent in electron conductivity and diffusivity of lithium ions can be produced.

The average pore diameter $P_{DAVE}$ is measured using the above-mentioned mercury intrusion technique.

As a laser diffraction type particle size distribution analyzer, for example, Mastersizer produced by Malvern Instruments Ltd. or the like can be used.

It is preferred that graphite material has an average interplanar spacing $d_{002}$ of plane (002) of 0.3356 nm to 0.3375 nm by the X-ray diffraction method. Further, a thickness Lc of the crystal in the C-axis direction is preferably 30 to 1,000 nm, more preferably 100 nm or less, particularly preferably 50 nm or more and 100 nm or less. Also, a thickness La of the crystallite in the a-axis direction is preferably 100 nm or more. By setting the average interplanar spacing and the thickness to be in such ranges, sites in which active materials are doped can be obtained sufficiently, and the number of edge portions of crystallite is not excessively large. Therefore, the decomposition of an electrolyte can be further suppressed. D002, La and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

When the average interplanar spacing d002 is in a range of 0.3356 nm to 0.3375 nm, the crystallinity of graphite is high and a space in which lithium ions can be intercalated increases.

In the preferred embodiment of the present invention, as crushing is not performed after carbonization or graphitization, a rhombus peak ratio is 5% or less, more preferably 1% or less.

When the graphite material falls in such ranges, an interlayer compound with lithium is formed smoothly. If the interlayer compound is used as a negative electrode material in a lithium secondary battery, the lithium adsorption/desorption reaction is hardly inhibited, which enhances a rapid charging/discharging characteristic.

It should be noted that the peak ratio (x) of the rhombohedral structure in graphite powder is obtained from actually measured peak strength (P1) of a hexagonal structure (100) plane and actually measured peak strength (P2) of a rhombohedral structure (101) plane by the following expression.

$x=P2/(P1+P2)$

The laser Raman value R of the graphite material is preferably 0.05 to 5 and more preferably 0.07 to 4. By setting the Raman value R within the above-mentioned range, insertion/elimination of lithium ions can become easier, and by having a graphite structure which has regularity inside the material, an insertion amount of lithium ions can be secured.

In the present invention, a laser Raman value R means the intensity ratio $I_D/I_G$ between the peak intensity ($I_D$) in a range of 1300 to 1400 cm$^{-1}$ and the peak intensity ($I_G$) in a range of 1580 to 1620 cm$^{-1}$ as measured by Raman spectroscopy spectra. Here, the larger the R value means the lower crystallinity.

The laser Raman value R can be calculated from the peak intensity in the vicinity of 1360 cm$^{-1}$ and the peak intensity in the vicinity of 1580 cm$^{-1}$ measured by using, for example, a laser Raman spectrometer (NRS-3100) produced by JASCO Corporation, under conditions as below:
exciting wavelength: 532 nm, incident slit width: 200 μm, exposure time: 15 seconds, number of integration: 2, and grating (number of grooves): 600 lines/mm.

In the graphite material in a preferred embodiment of the present invention, an aspect ratio of the primary particles which is described as maximum length $D_{max}$/maximum length vertical length $DN_{max}$ ($D_{max}$: maximum length at two points on a contour of a particle image, $DN_{max}$: shortest length connecting two straight lines vertically, when an image is sandwiched between two straight lines parallel to the maximum length), is preferably 1.00 to 1.32. The aspect ratio is more preferably 1.00 to 1.20. By setting the aspect ratio of the particles to be small, a high-density electrode satisfying the energy density required for a large battery can be produced.

In the present specification, the aspect ratio can be measured by image analysis. As for measurement points, at least 3,000 points, preferably 30,000 points or more, more preferably 50,000 points or more are measured and a calculated average value is used.

In a preferred embodiment of the present invention, D50 in the graphite material is preferably 3 to 30 μm in a particle diameter distribution based on a volume measured by a laser diffraction method. As a laser diffraction type granular variation measurement device, a Mastersizer produced by Malvern Instruments Ltd. or the like can be used.

Further, it is preferred that the graphite material in a preferred embodiment of the present invention does not substantially contain particles with a particle diameter of 0.5 μm or less. The particles with a particle diameter of 0.5 μm or less have a large active point on the surface, which decreases an initial efficiency of the battery. Here, the expression that "the graphite material does not substantially contain particles with a particle diameter of 0.5 μm or less" means that the content of the particles with a particle diameter of 0.5 μm or less is 0.1 mass % or less. The content of the particles with a particle diameter of 0.5 μm or less can be measured by the laser diffraction type granular variation measurement device mentioned above. Further, a substantial minimum particle diameter can also be obtained by measuring D0.

In a preferred embodiment of the present invention, the BET specific surface area (SBET) of the graphite material is preferably 0.4 $m^2/g$ to 5 $m^2/g$, and more preferably 0.6 $m^2/g$ to 3.5 $m^2/g$. By setting the SBET value to be within the above-mentioned range, a wide area to be contacted with an electrolyte can be secured without excessive use of a binder and lithium ions can be smoothly inserted and released, and thereby the reaction resistance of the battery can be lowered.

In a preferred embodiment of the present invention, it is preferable that the loose bulk density (0 tapping) of the graphite material is 0.7 $g/cm^3$ or more, and the powder density (tap density) when tapping is performed 400 times is 0.8 to 1.6 $g/cm^3$. The powder density is more preferably 0.9 to 1.6 $g/cm^3$, most preferably 1.1 to 1.6 $g/cm^3$.

The loose bulk density is obtained by dropping 100 g of the sample to a graduated cylinder from a height of 20 cm, and measuring the volume and mass without applying a vibration. The tap density is obtained by measuring the volume and mass of 100 g of powder tapped 400 times using an Autotap produced by Quantachrome Instruments.

These methods are based on ASTM B527 and JIS K5101-12-2, and the fall height of the Autotap in the tap density measurement is 5 mm.

By setting the loose bulk density to be 0.7 $g/cm^3$ or more, the electrode density before pressing at a time of application to an electrode can be enhanced further. Based on this value, it can be predicted whether or not a sufficient electrode density can be obtained by one roll pressing. Further, if the tap density is within the above-mentioned range, the electrode density achieved during pressing can be enhanced sufficiently.

[Method of Producing the Graphite Material]

The graphite material in a preferred embodiment of the present invention can be produced by subjecting a carbon material to heat treatment at 2,000 to 3,300° C.

It is preferable to select the carbon material from the carbon material, petroleum-based pitch, coal-based pitch, petroleum-based coke, coal-based coke and a mixture thereof; and the maximum thermal histeresis of the material is preferably 500 to 1,800° C. Among these, preferred is petroleum-based coke; and a residue obtained by distilling crude oil under a normal atmospheric pressure or a reduced pressure in an oil refining process, pyrolytic tar, etc. subjected to coking can be used. An example of such a carbon material include the material obtained by subjecting a residue of crude oil, in which the total of the compositions of the Asphaltene component and the resin component be 30% by mass to 80% by mass and the sulfur component be 0.3 to 6 mass % to a delayed coking process, wherein a heating furnace heater output temperature before a coke drum is regulated to be 550 to 580° C. The material is the one described in claim 15 of Japanese Patent No. 4738553 (U.S. Patent Publication No. 2012/0045642) and the details are described in paragraphs [0039] to [0044] of the specification.

It is preferred that, when the carbon material is heated from 300° C. to 1,200° C. in an inactive atmosphere, weight reduction on heating (for example, a volatile component of hydrocarbon involved in carbonization) is 5 to 20% by mass.

The carbon material whose weight reduction on heating is less than 5% by mass tends to form plate-shaped particles after crushing. Further, a crushed surface (edge portion) is exposed, and a specific area increases, which also increases side reaction. On the contrary, in the carbon material whose weight reduction on heating exceeds 20% by mass, particles adhere to each other in a large amount after graphitization, which influences a yield.

The carbon material is crushed before graphitization. For crushing the carbon material, known jet milling, hammer milling, roller milling, pin milling, vibration milling, or the like is used. It is preferred that the carbon material be crushed in a state in which a thermal hysteresis is as low as possible. When a thermal hysteresis is lower, the carbon material has a low hardness and is easily crushed, and since the cracks during crushing have almost random directions, it tends to have a smaller aspect ratio. Further, a probability with which an edge portion exposed in the crushed surface is recovered in a later heating process increases, and this has an effect of reducing side reaction during charging/discharging.

It is preferred that the crushed carbon material be classified so that an average particle diameter (D50) based on a volume measured by the laser diffraction method is 3 to 30 μm and more preferably 3 to 20 μm. When D50 is large, the electrode density is less likely to increase. In contrast, when the average particle diameter is small, side reaction tends to occur during charging/discharging. D50 can be measured by Mastersizer (produced by Malvern Instruments Ltd.) of a laser diffraction type.

The average aspect ratio of the crushed carbon material is preferably 1 to 4, more preferably 1 to 2, still more preferably 1.00 to 1.32 and most preferably 1.00 to 1.20. The aspect ratio can be measured by the method described above.

The crushed carbon material may be sintered at a low temperature of about 500 to 1,800° C. in a non-oxidative atmosphere before graphitization. A preferred temperature is 800 to 1,500° C. The low-temperature sintering can reduce the generation of gas in the subsequent graphitization and can also lower the bulk density, which can reduce a cost for graphitization.

Also, the carbon material may be preheated at 800 to 1,500° C. before crushing instead of being sintered at a low temperature after crushing.

It is preferable to perform the graphitization treatment in an environment with a certain concentration of oxygen. The graphitization treatment is conventionally carried out under atmosphere without containing oxygen, for example, in a nitrogen-sealed environment and an argon-sealed environment. However, if the graphitization treatment is performed in such an environment, the graphite particles having specific pores as described above cannot be obtained.

There is no limitation on the graphitization treatment as long as it is performed in an environment with a certain oxygen concentration. The treatment can be carried out, for example, by a method of putting a carbon material in a graphite material without closing the lid in an Acheson furnace filled with a filler of carbon particles or graphite particles; and generating heat by passing a current through the carbon material in a state that the top of the material is in contact with an oxygen-containing gas to thereby carry out graphitization. In this case, in order to prevent the carbon material and the substances contained in the carbon material from reacting explosively, or to prevent the explosively-reacted carbon materials from being blown off, the crucible may be lightly shut off from the oxygen-containing gas by covering the top of the crucible with a carbonized or graphitized felt and porous plate. A small amount of argon or nitrogen may be allowed to flow into the furnace, however, it is preferable not to substitute the atmosphere completely with argon or nitrogen but to adjust the oxygen concentration in the vicinity of the surface of the carbon material (within 5 cm) to 1% or more, preferably 1 to 5% in the graphitization process. As an oxygen-containing gas, air is preferable but a low-oxygen gas in which the oxygen concentration is lowered to the above-mentioned level may be used as well. Using argon and nitrogen in a large amount requires energy for condensing the gas, and if the gas is circulated, the heat required for the graphitization is to be exhausted out of the system and further energy is to be required. From this viewpoint, it is preferable to perform the graphitization in an environment open to the atmosphere.

However, when the graphitization is carried out as described above, an impurity component derived from the carbon material is likely to precipitate in the region being in contact with oxygen, and it is desirable to remove it. Examples of the method for removing the impurity include a method of removing the graphite material in the region from the position being in contact with an oxygen-containing air to a predetermined depth. That is, the graphite material underlying deeper than the above position is obtained. A determined depth is 2 cm, preferably 3 cm and more preferably 5 cm from the surface.

The carbon material underlying deeper has few chances to be in contact with oxygen. Therefore, to obtain many graphite particles having specific pores as described above, it is preferable to obtain a graphite material within 2 m from the portion being contact with the oxygen-containing gas, more preferably within 1 m, and more preferably within 50 cm.

The graphitization treatment is generally performed at 2,000° C. or higher, preferably 2,500° C. or higher, more preferably 2,900° C. or higher, and most preferably 3,000° C. or higher. Heating to 3,200° C. or higher, or further to 3,300° C. or higher is preferable from the viewpoint of permitting the reduction of the impurities. However, in a temperature region above a certain degree, the temperature does not elevate in proportion to the energy input and the graphitization will not proceed either. Therefore, the graphitization treatment is performed preferably at 3,500° C. or lower and more preferably 3,300° C. or lower.

[Composite Material/Mixed Material]

The graphite material in a preferred embodiment of the present invention can be used under the condition of being coated with another carbon material.

For example, the surface of graphite particles forming the graphite material can be coated with optically isotropic carbon. The coating can improve an input characteristic during charging, which enhances the characteristics required for a large battery. Although the coating amount is not particularly limited, the amount of the coating material is preferably 0.1 to 10 parts by mass based on 100 parts by mass of the core material.

As the coating method, a known technology can be used, which is not particularly limited. For example, the coating can be carried out by a method of performing coating of graphite particles by a mechanochemical method with Mechanofusion produced by Hosokawa Micron Corporation, using a coal-tar pitch of a diameter of 0.1 to 1 μm and a graphite material, and heating the graphite particles at 800° C. to 3,300° C. in a non-oxidative atmosphere to form optically isotropic carbon on the surface; and a method of allowing a composition containing a polymer to adhere to the surface of at least a part of the graphite particles and heat-treating the graphite particles at 800° C. to 3,300° C. in a non-oxidative atmosphere to form optically isotropic carbon on the surface. As the composition containing a polymer, for example, a composition containing dry oil or aliphatic acid thereof and a phenol resin may be used. The latter method is described in, for example, JP 2003-100293 A (International publication WO 03/028128) and JP 2005-019397 A (International publication WO 2004/109825).

Further, in the graphite particle in a preferred embodiment of the present invention, part of carbon fiber can adhere to the surface of the graphite particles. By allowing the carbon fiber to adhere to the surface of the graphite particles, the carbon fiber in an electrode is easily dispersed, and the cycle characteristic and the current load characteristic are further enhanced due to the synergetic effect of the carbon fiber in combination with the characteristics of the graphite particles serving as the core material. Although the adhesion amount of the carbon fiber is not particularly limited, the adhesion amount is preferably 0.1 to 5 parts by mass in terms of 100 parts by mass of the graphite material serving as a core.

As the adhesion method, a known method may be used, which is not particularly limited. For example, using a coal-tar pitch with a diameter of 0.1 to 1 μm, a graphite material and carbon fiber, carbon fiber is allowed to adhere to the graphite particles during the coating of the graphite particles by a mechanochemical method with a Mechanofusion produced by Hosokawa Micron Corporation, followed by heating at 800° C. to 3,300° C. in a non-oxidative atmosphere. Further, a composition containing a polymer is allowed to adhere to the surface of at least apart of the graphite particles, fibrous carbon is mixed with the graphite particles, the fibrous carbon is allowed to adhere to the graphite particles via the composition containing a polymer, and then the graphite particles are heat-treated at 800° C. to 3,300° C. in a non-oxidative atmosphere, thereby carrying out the coating. As the composition containing a polymer, for example, a composition containing dry oil or aliphatic acid thereof and a phenol resin can be used. The latter method is described in, for example, JP 2003-100293 A (International publication WO 03/028128) and JP 2005-019397 A (International publication WO 2004/109825).

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the surfaces of the graphite particles, particularly preferred is vapor-grown carbon fiber.

Vapor-grown carbon fiber is, for example, produced by: using an organic compound as a material; introducing an organic transition metal compound as a catalyst into a high-temperature reaction furnace with a carrier gas to form fiber; and then conducting heat treatment (see, for example, JP 60-54998 A (U.S. Pat. No. 4,572,813) and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a material for carbon fiber include toluene, benzene, naphthalene, ethylene, acetylene, ethane, natural gas, a gas of carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by crushing or shredding long fiber obtained by vapor deposition or the like. Further, the carbon fiber may be coagulated on a flock.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by sintering (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, a portion having a hollow structure in which the fiber as a whole communicates with each other may be present. For this reason, carbon layers forming a cylindrical portion of the fiber are formed continuously. The hollow structure refers to a structure in which a carbon layer is wound in a cylindrical shape and includes an incomplete cylindrical structure, a structure having a partially cut part, two stacked carbon layers connected into one layer, and the like. Further, the cross-section is not limited to a complete circular cross-section, and the cross-section of the cylinder includes an oval cross-section or a polygonal cross-section.

Further, the average interplanar spacing $d_{002}$ of a (002) plane by the X-ray diffraction method of the carbon fiber is preferably 0.344 nm or less, more preferably 0.339 nm or less, particularly preferably 0.338 nm or less. Further, it is preferred that a thickness ($L_c$) in a C-axis direction of crystal be 40 nm or less.

[Carbon Material for Battery Electrodes]

The carbon material for battery electrodes in a preferred embodiment of the present invention contains the above-mentioned graphite material. When the above-mentioned graphite material is used as a carbon material for a battery electrode, a battery electrode having a high energy density while maintaining a high capacitance, a high coulomb efficiency and high cycle characteristics can be obtained.

The carbon material for a battery electrode may be used as, for example, a negative electrode active material and an agent for imparting conductivity to a negative electrode of a lithium ion secondary battery.

While the carbon material for battery electrodes in a preferred embodiment of the present invention may comprise the above-mentioned graphite material only, the materials obtained by blending spherical natural or artificial graphite having d002 of 0.3370 nm or less in an amount of 0.01 to 200 parts by mass and preferably 0.01 to 100 parts by mass; or natural or artificial graphite (for example, graphite having a scale shape) having d002 of 0.3370 nm or less and aspect ratio of 2 to 100 in an amount of 0.01 to 120 parts by mass and preferably 0.01 to 100 parts by mass based on 100 parts by mass of the graphite material. By using the graphite material mixed with other graphite materials, the graphite material can be added with excellent characteristics of the other graphite materials while maintaining the excellent characteristics of the graphite material in a preferred embodiment of the present invention. Specifically, when mesocarbon microbeads (MCMB) is added as the spherical artificial graphite, the density of the electrode produced from the material increases due to the high fragility of MCMB, and the volume energy density can be increased. With respect to mixing of these materials, the blending amount can be determined by appropriately selecting the materials to be mixed depending on the required battery characteristics.

Carbon fiber may also be mixed with the carbon material for battery electrodes. As the carbon fiber, carbon fiber similar to the carbon fiber described above may be used. The mixing amount is 0.01 to 20 parts by mass, preferably 0.5 to 5 parts by mass in terms of total 100 parts by mass of the above-mentioned graphite material.

[Paste for Electrodes]

The paste for an electrode of the present invention contains the above-mentioned carbon material for a battery electrode and a binder. The paste for an electrode can be obtained by kneading the carbon material for a battery electrode with a binder. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 3 to 20 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; and isopropanol. In the case of the binder using water as a solvent, it is preferred to use a thickener together. The amount of the solvent is adjusted so as to obtain a viscosity at which a paste can be applied to a collector easily.

[Electrode]

An electrode in a preferred embodiment of the present invention is formed of a molding of the above-mentioned paste for an electrode. The electrode is obtained, for example, by applying the paste for an electrode to a collector, followed by drying and pressure molding.

Examples of the collector include foils and mesh of aluminum, nickel, copper, stainless steel and the like. The coating thickness of the paste is generally 50 to 200 μm. When the coating thickness becomes too large, a negative electrode may not be placed in a standardized battery container. There is no particular limitation to the paste coating method, and an example of the coating method includes a method involving coating with a doctor blade or a bar coater, followed by molding with roll pressing or the like.

Examples of the pressure molding include roll pressure molding, compression molding, and the like. The pressure for the pressure molding is preferably about 1 to 3 t/cm². As the electrode density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Therefore, an electrode having the high electrode density can be obtained. The maximum value of the electrode density of the electrode obtained using the paste for an electrode in a preferred embodiment of the present invention is generally 1.7 to 1.9 g/cm³. The electrode thus obtained is suitable for a negative electrode of a battery, in particular, a negative electrode of a secondary battery.

[Battery, Secondary Battery]

A battery or a secondary battery can be produced, using the electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are soaked in an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co, and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and x is 0 to 1.2), or $Li_yN_2O_4$ (N contains at least Mn, and y is 0 to 2) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) and materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCO_bV_{1-b}Oz$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 μm. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume.

Although the specific area is not particularly limited, the area is preferably 0.01 to 50 m²/g, particularly preferably 0.2 m²/g to 1 m²/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolyte forming the lithium ion secondary battery in a preferred embodiment of the present invention, a known organic electrolye, inorganic solid electrolyte, and polymer solid electrolyte may be used, but an organic electrolyte is preferred in terms of electric conductivity.

As a solvent of the organic electrolyte (non-aqueous solvent), preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, or 1,3-dioxolan; a carbonate such as ethylene carbonate or propylene carbonate; γ-butyrolactone; N-methylpyrrolidone; acetonitrile; nitromethane, 1,2-dimethoxyethane; or the like. Further, there are preferably exemplified: carbonates such as ethylene carbonate, butylene carbonate, diethyl carbonate, dimethyl carbonate, methyl ethyl carbonate, propylene carbonate, vinylene carbonate, and esters such as γ-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for graphite material of Examples and Comparative Examples, average interplanar spacing (d002) by an X-ray diffraction method, various physical properties by mercury intrusion technique (total pore volume, accumulated volume of the pores of 3 μm or less, specific surface area (SHG) and average pore diameter ($P_{DAVE}$)), Raman peak intensity value R are measured by the method described in detail in the "Best Mode for carrying out the Invention" of the specification. Further, the methods for measuring other physical properties are given below.

(1) Average Particle Diameter (D50)

The average particle diameter based on a volume (D50) was determined using Mastersizer produced by Malvern Instruments Ltd. as a laser diffraction type measurement device of particle size distribution.

(2) BET Specific Surface Area (SBET)/Specific Surface Area Determined by Mercury Intrusion Technique (SHG)

Using a specific area measurement apparatus NOVA-1200 (produced by Yuasa Ionics Inc.), a BET specific surface area (SBET) was measured by a BET method that is a general measurement method of a specific surface area; and SBET/SHG was calculated in terms of the specific surface area determined by the mercury intrusion technique (SHG).

(3) Visual Check Rate of the Pores

When 200 fields of view were observed with an SEM (field-emission scanning type, wavelength dispersion of about 3 to 4 mm, accelerating voltage of 0.5 keV, secondary electron image, GB:high, 15,000-fold magnification), a number of fields was counted in which a cylindrical pore having an aperture in a shape having a diameter of 15 nm to 200 nm, a circularity degree of 0.75 to 1.0 and the major axis/minor axis ratio of 1.0 to 1.25 was observed to thereby calculate the visual check rate (%).

Using the image analysis software ImageJ (produced by NIH) on the electron microscope image at the 50,000-fold magnification, the circularity and major axis/minor axis of the apertures of the observed pores were calculated.

(4) Method for Evaluating Batteries (a) Production of Paste:

To 1 part by mass of a graphite material, 0.1 part by mass of KF polymer L1320 produced by Kureha Corporation (N-methylpyrrolidone (NMP) solution containing 12% by mass of polyvinylidene fluoride (PVDF)) is added, and the mixture is kneaded by a planetary mixer to obtain a main undiluted solution.

(b) Production of an Electrode:

NMP is added to the main undiluted solution and the viscosity thereof is adjusted. After that, the resultant solution is applied to a high-purity copper foil to a thickness of 250 μm using a doctor blade. The high-purity copper foil thus obtained is dried in vacuum at 120° C. for 1 hour and punched into a size of 18 mmΦ. The electrode thus punched out is sandwiched between pressing plates made of super-steel and pressed so that a press pressure becomes about $1\times10^2$ to $3\times10^2$ N/mm² ($1\times10^3$ to $3\times10^3$ kg/cm²) with respect to the electrode. Then, the electrode is dried in a vacuum drier at 120° C. for 12 hours to obtain an electrode for evaluation.

(c) Production of a Battery:

A three electrode cell is produced as follows. The following operation is performed in a dry argon atmosphere at a dew point of −80° C. or less.

In a cell (inner diameter: about 18 mm) with a screwed-type lid made of polypropylene, the carbon electrode with a copper foil produced in the above-mentioned item (b) and a metal lithium foil are sandwiched and stacked between separators (microporous films made of polypropylene (Cell Guard 2400)). Further, metal lithium for reference is stacked in the same way. An electrolyte is added to the resultant to obtain a cell for testing.

(d) Electrolyte:

In a mixed solution of 8 parts by mass of ethylene carbonate (EC) and 12 parts by mass of diethyl carbonate (DEC), 1 mol/liter of $LiPF_6$ is dissolved as an electrolyte.

(e) Measurement Test of a Discharge Capacity and Rate Characteristics:

Regarding charging (insertion of lithium into carbon), constant current (CC) charging is performed at 0.2 mA/cm² from a rest potential to 0.002V. Next, the charging is switched to constant voltage (CV) charging at 0.002 V and stopped when a current value drops to 25.4 μA.

A constant-current and constant-voltage discharge test is performed at a current density of 0.4 mA/cm² (corresponding to 0.2C) and 10 mA/cm² (corresponding to 5C). The test is performed in a thermostat bath set at 25° C.

The discharge capacity was calculated by dividing the discharge electricity at 0.4 mA/cm² (corresponding to 0.2C) by the active substance mass per unit area. Regarding the rate characteristics, after discharge was performed at 0.4 mA/cm² (corresponding to 0.2C) to measure the discharge capacity, the battery was charged according to the method as described above, and the discharge capacity at 10 mA/cm² (corresponding to 5C) was measured, which was divided by the discharge capacity at 0.4 mA/cm² (corresponding to 0.2C) to obtain a value indicating the rate characteristics.

(f) Measurement Test of a Charge/Discharge Cycle Capacity Keeping Ratio

A constant-current and constant-voltage charge/discharge test is performed at a current density of 2 mA/cm² (corresponding to 1C).

Regarding charging (insertion of lithium into carbon), constant current (CC) charging is performed at 0.2 mA/cm² from a rest potential to 0.002V. Next, the charging is switched to constant voltage (CV) charging at 0.002 V and stopped when a current value drops to 25.4 μA.

Regarding discharging (discharge from carbon), CC discharging is performed at a predetermined current density and cut off at a voltage of 1.5 V. Further, the measurement is performed in a thermostat bath set at 60° C., and charge/discharge is repeated 100 cycles.

(g) Measurement Test of Li Acceptability:

Constant current (CC) charging was performed at 0.2 mA/cm² from a rest potential to 2 mV. Next, the charging is switched to constant voltage (CV) charging at 2 mV and stopped when a current value dropped to 12.0 µA. CC discharging was performed at 0.2 mA/cm² and cut off at a voltage of 1.5 V. The charge and discharge was repeated twice.

Next, constant current (CC) charging was performed at 2 mA/cm² from a rest potential to 2 mV. Next, constant voltage (CV) charging was performed at 2 mV and stopped when a current value dropped to 12.0 µA. Among the total charging capacity, the ratio of the CC charging capacity was calculated to evaluate the charging characteristics.

The higher ratio means the better charging characteristics.

(5) Evaluation of the Infiltration Rate (Absorption Time) of the Electrolyte and a Composition for a Polymer Solid Electrolyte:

Using a low-volatile propylene carbonate (PC) having a viscosity almost equal to that of each electrolyte, the PC was delivered by drops of 3 µl each by a microcyringe to the center of the electrode (18 mmΦ) produced in the above (4) (b) in the air at 25° C., the time for the PC to infiltrate into the electrode was measured. The measurement was performed three times and the average value was employed for the evaluation.

Example 1

A residue obtained by distilling Mexican crude oil under reduced pressure is used as a material. The properties of the material are as follows: specific gravity: 0.7° API, Asphaltene component: 15% by mass, resin component: 14% by mass, and sulfur component: 5.3% by mass. This material is injected into a delayed coking process. At this time, the process is performed at a heating furnace heater output temperature of 560° C. before a coke drum. The internal pressure is set to be about 207 kPa (30 psig). The coke is cooled with water and discharged from the coke drum. The obtained coke is heated at 120° C. and dried to a moisture-containing ratio of 0.5% by mass or less. At this time, the reduced amount by heating in an argon atmosphere from 300° C. to 1,200° C. is 13.1% by mass. The dried coke is crushed with a Bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.2 pm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 10 to 25 cm was taken out, mixed well and used as a sample. After measuring the various physical properties of the sample, an electrode was produced as described above and the cycle characteristics and the like were measured. Table 1 shows the results.

Figure 4:
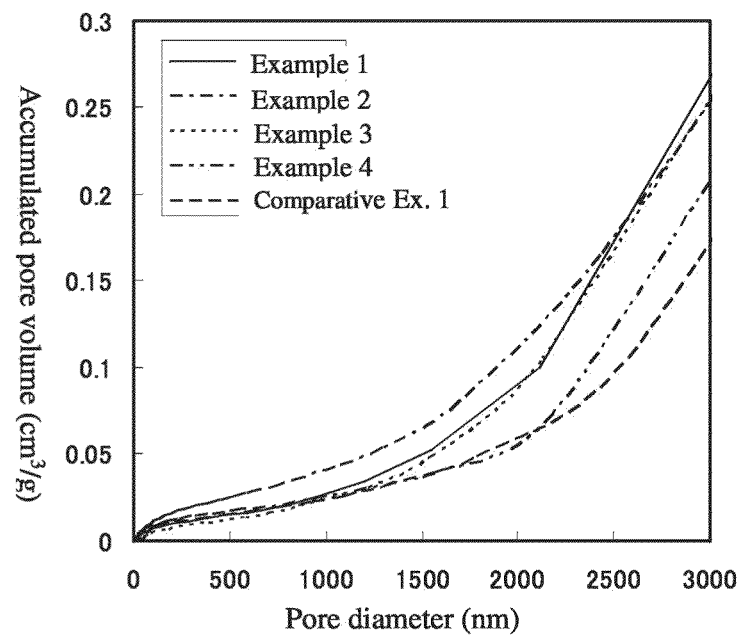
[FIG. 4] A graph showing the accumulated pore volume to a pore diameter in Examples 1 to 4 and Comparative Example 1

FIG. 1 shows an SEM image photograph in view of the sample surface. FIG. 4 shows a graph on which the accumulated pore volume for the pore diameter is plotted.

Example 2

A residue obtained by distilling Californian crude oil under reduced pressure is used as a material. The properties of the material are as follows: specific gravity: 3.0° API, Asphaltene component: 28% by mass, resin component: 11% by mass, and sulfur component: 3.5% by mass. This material is injected into a delayed coking process. At this time, the internal pressure is set to be about 214 kPa (31 psig) and the process is performed at a heating furnace heater output temperature of 570° C. before a coke drum. Then, the obtained coke is granulated to a particle diameter of about 3 to 8 mm unlike the ordinary process. The coke is cooled with water and discharged from the coke drum. Then, the coke is heated at 120° C. and dried to a moisture-containing ratio of 0.5% by mass or less. At this time, the reduced amount by heating in an argon atmosphere from 300° C. to 1,200° C. is 12.8% by mass. The dried coke is crushed with a Bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.1 µm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 5 to 20 cm was taken out, mixed well and used as a sample. After measuring the various physical properties of the sample in the same manner as in Example 1, an electrode was produced as described above and the cycle characteristics and the like were measured. Table 1 shows the results.

Figure 2:
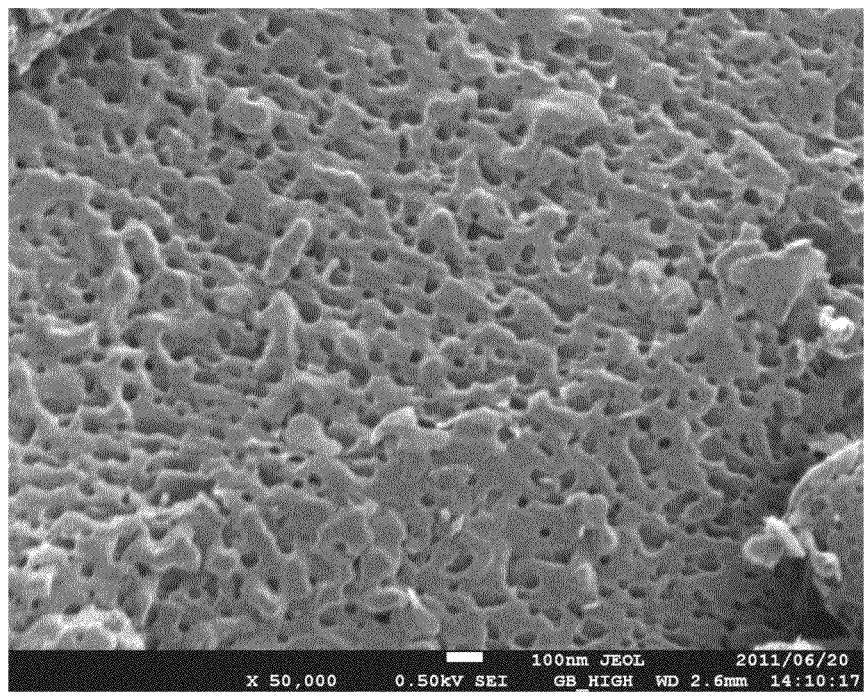
[FIG. 2] An electron microscope image of the graphite material in Example 2

FIG. 2 shows an SEM image photograph in view of the sample surface. FIG. 4 shows a graph on which the accumulated pore volume for the pore diameter is plotted.

Example 3

A residue obtained by distilling Venezuelan crude oil under reduced pressure is used as a material. The properties of the material are as follows: specific gravity: 3.4° API, Asphaltene component: 21% by mass, resin component: 11% by mass, and sulfur component: 3.3% by mass. This material is injected into a delayed coking process. At this time, the internal pressure is set to be about 138 kPa (20 psig) and the process is performed at a heating furnace heater output temperature of 570° C. before a coke drum. The coke is cooled with water and discharged from the coke drum. The obtained coke is heated at 120° C. and dried to a moisture-containing ratio of 0.5% by mass or less. At this time, the reduced amount by heating in an argon atmosphere from 300° C. to 1,200° C. is 11.8% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.0 µm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 20 to 40 cm was taken out, mixed well and used as a sample. After measuring the various physical properties of the sample in the same way as in Example 1, an electrode was produced as described above and the cycle characteristics and the like were measured in the same manner as in Example 1. Table 1 shows the results.

Figure 3:
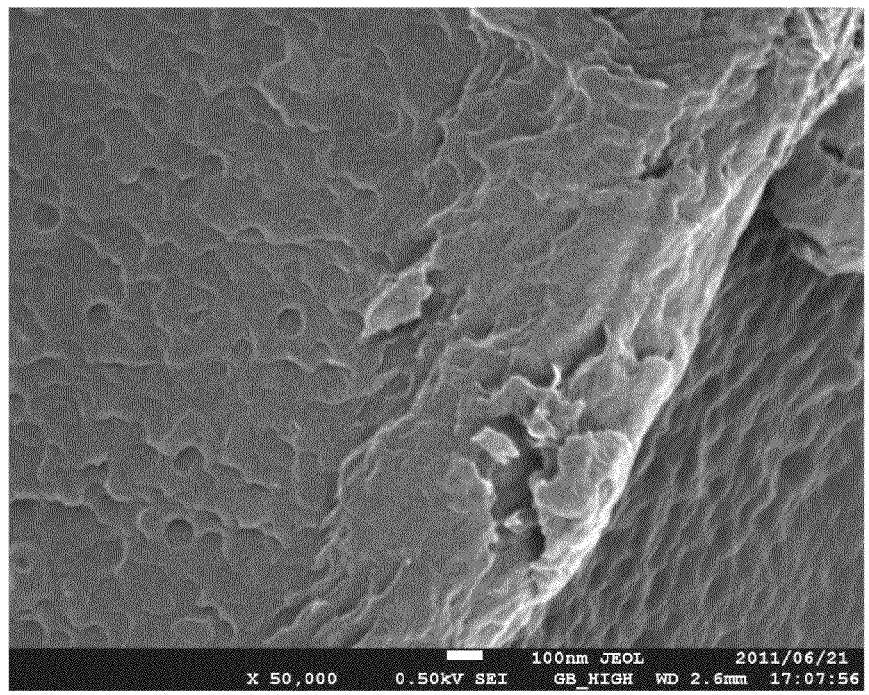
[FIG. 3] An electron microscope image of the graphite material in Example 3

FIG. 3 shows an SEM image photograph in view of the sample surface. FIG. 4 shows a graph on which the accumulated pore volume for the pore diameter is plotted.

Example 4

A residue obtained by distilling Venezuelan crude oil under reduced pressure is used as a material. The properties of the material are as follows: specific gravity: 3.4° API, Asphaltene component: 21% by mass, resin component: 11% by mass, and sulfur component: 3.3% by mass. This material is injected into a delayed coking process. At this time, the internal pressure is set to be about 138 kPa (20 psig) and the process is performed at a heating furnace heater output temperature of 570° C. before a coke drum. The coke is cooled with water and discharged from the coke drum. Then, the coke is heated at 120° C. and dried to a moisture-containing ratio of 0.5% by mass or less. At this time, the reduced amount by heating in an argon atmosphere from 300° C. to 1,200° C. is 11.8% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.0 µm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 10 to 25 cm was taken out, mixed well and used as a sample. After measuring the various physical properties of the sample in the same way as in Example 1, an electrode was produced as described above and the cycle characteristics and the like were measured in the same manner as in Example 1. Table 1 shows the results.

FIG. 4 shows a graph on which the accumulated pore volume for the pore diameter is plotted.

Example 5

A residue obtained by distilling Mexican crude oil under reduced pressure is used as a material. The properties of the material are as follows: specific gravity: 0.7° API, Asphaltene component: 15% by mass, resin component: 14% by mass, and sulfur component: 5.3% by mass. This material is injected into a delayed coking process. At this time, the internal pressure is set to be about 207 kPa (30 psig) and the process is performed at a heating furnace heater output temperature of 560° C. before a coke drum. Then, the coke is granulated to a particle diameter of about 3 to 8 mm unlike the ordinary process. The coke is cooled with water and discharged from the coke drum. The obtained coke is heated at 120° C. and dried to a moisture-containing ratio of 0.5% by mass or less. At this time, the reduced amount by heating in an argon atmosphere from 300° C. to 1,200° C. is 14.3% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.2 µm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 10 to 25 cm was taken out, mixed well and used as a sample. After measuring the various physical properties of the sample in the same way as in Example 1, an electrode was produced as described above and the cycle characteristics and the like were measured. Table 1 shows the results.

Example 6

A residue obtained by distilling Californian crude oil under reduced pressure is used as a material. The properties of the material are as follows: specific gravity: 3.0° API, Asphaltene component: 28% by mass, resin component: 11% by mass, and sulfur component: 3.5% by mass. This material is injected into a delayed coking process. At this time, the internal pressure of the furnace is set to be about 214 kPa (31 psig) and the process is performed at a heating furnace heater output temperature of 570° C. before a coke drum. The coke is cooled with water and discharged from the coke drum. The obtained coke is heated at 120° C. and dried to a moisture-containing ratio of 0.5% by mass or less. At this time, the reduced amount by heating in an argon atmosphere from 300° C. to 1,200° C. is 12.8% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 5.1 µm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 20 to 40 cm was taken out, mixed well and used as a sample. After measuring the various physical properties of the sample in the same way as in Example 1, an electrode was produced as described above and the cycle characteristics and the like were measured. Table 1 shows the results.

Example 7

A residue obtained by distilling Mexican crude oil under reduced pressure is used as a material. The properties of the material are as follows: specific gravity: 0.7° API, Asphaltene component: 15% by mass, resin component: 14% by mass, and sulfur component: 5.3% by mass. This material is injected into a delayed coking process. At this time, the internal pressure of the furnace is set to be about 207 kPa (30 psig) and the process is performed at a heating furnace heater output temperature of 560° C. before a coke drum. The coke is cooled with water and discharged from the coke drum. The obtained coke is heated at 120° C. and dried to a moisture-containing ratio of 0.5% by mass or less. At this time, the reduced amount by heating in an argon atmosphere from 300° C. to 1,200° C. is 13.1% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.2 µm, substantially containing no particles each having a particle diameter of 0.5 µm or less.

The crushed carbon material was placed in a graphite crucible and a carbonized carbon felt (2 mm) was softly put on the crucible to prevent a rapid inflow of the air. The material was heated at 3,100° C. in an Acheson furnace and the material in the portion from the surface to the depth of 30 to 40 cm was taken out, mixed well and used as a sample. After measuring the various physical properties of the sample in the same way as in Example 1, an electrode was produced as described above and the cycle characteristics and the like were measured. Table 1 shows the results.

Comparative Example 1

A residue obtained by distilling Venezuelan crude oil under reduced pressure is used as a material. The properties of the material are as follows: specific gravity: 3.4° API, Asphaltene component: 21% by mass, resin component: 11% by mass, and sulfur component: 3.3% by mass. This material is injected into a delayed coking process. At this time, the internal pressure of the furnace is set to be about 138 kPa (20 psig) and the process is performed at a heating furnace heater output temperature of 570° C. before a coke drum. The coke is cooled with water and discharged from the coke drum. The obtained coke is heated at 120° C. and dried to a moisture-containing ratio of 0.5% by mass or less. At this time, the reduced amount by heating in an argon atmosphere from 300° C. to 1,200° C. is 11.8% by mass. The dried coke is crushed with a bantam mill produced by Hosokawa Micron Corporation. Next, the crushed coke is subjected to air-flow screening with Turboclassifier TC-15N produced by Nisshin Engineering Inc. to obtain a carbon material, wherein D50 is 15.0 μm, substantially containing no particles each having a particle diameter of 0.5 μm or less.

A graphite crucible was filled with the crushed carbon material and covered with a screw-on lid, and coke was put on top of the crucible in the thickness of 30 cm or more to embed the crucible. The material was heated at 3,100° C. in an Acheson furnace and used as a sample. After measuring the various physical properties of the sample in the same way as in Example 1, an electrode was produced as described above and the cycle characteristics and the like were measured. Table 1 shows the results.

FIG. 4 shows a graph on which the accumulated pore volume for the pore diameter is plotted.

Table 1 shows the measurement results of various physical properties (average interplanar spacing (d002); total pore volume; accumulated volume of the pores of 3 μm or less; BET specific surface area, specific surface area by mercury intrusion technique and the ratio between the values (area by BET method/area by mercury intrusion technique); an average particle diameter (D50), average pore diameter ($P_{DAVE}$) and the ratio between the values (D50/$P_{DAVE}$); intensity ratio $I_D/I_G$ between the peak intensity ($I_D$) in a range of 1300 to 1400 cm$^{-1}$ and the peak intensity ($I_G$) in a range of 1580 to 1620 cm$^{-1}$ as measured by Raman spectroscopy spectra (value R); and visual check rate of the pores of the carbon material in Examples 1 to 1 and Comparative Example 1; and absorption time, discharge capacity, Li acceptability, capacitance retention ratio after 100 cycles and rate characteristics (5C/0.2C) of the electrode made from each of carbon materials.

| Unit | d002 nm | Total pore volume cm³/g | Accumulated volume of the pores having a diameter of 3 μm or less cm³/g | BET specific surface area (SBET) m²/g | Specific surface area by mercury intrusion technology (SHG) m²/g | SBET/SHG — | D50 μm | $P_{DAVE}$ μm | D50/$P_{DAVE}$ — |
|---|---|---|---|---|---|---|---|---|---|
| Example 1 | 0.3363 | 0.453 | 0.259 | 1.65 | 1.32 | 1.25 | 14.7 | 2.73 | 5.38 |
| Example 2 | 0.3366 | 0.384 | 0.271 | 2.33 | 2.43 | 0.96 | 14.9 | 2.59 | 5.75 |
| Example 3 | 0.3364 | 0.431 | 0.230 | 2.52 | 3.76 | 0.67 | 14.7 | 2.78 | 5.29 |
| Example 4 | 0.3366 | 0.396 | 0.218 | 2.24 | 2.78 | 0.81 | 14.0 | 3.06 | 4.58 |
| Example 5 | 0.3366 | 0.39 | 0.262 | 2.98 | 2.43 | 1.23 | 14.2 | 2.94 | 4.83 |
| Example 6 | 0.3363 | 0.449 | 0.288 | 4.10 | 3.09 | 1.05 | 5.1 | 2.39 | 2.13 |
| Example 7 | 0.3365 | 0.397 | 0.227 | 1.70 | 1.81 | 0.94 | 15.1 | 2.73 | 5.53 |
| Comparative Example 1 | 0.3364 | 0.338 | 0.172 | 0.92 | 2.56 | 0.36 | 14.9 | 2.94 | 5.07 |

| Unit | Raman R value — | Visual check rate % | Absorption time seconds | Discharge capacity mAh/g | Li acceptability % | capacity retention rate after 100 cycles % | rate characteristics 5 C/0.2 C % |
|---|---|---|---|---|---|---|---|
| Example 1 | 0.31 | 2.0 | 856 | 332 | 69 | 83 | 90 |
| Example 2 | 0.21 | 13 | 604 | 314 | 67 | 82 | 91 |
| Example 3 | 0.06 | 16 | 677 | 328 | 62 | 84 | 92 |
| Example 4 | 0.08 | 15 | 582 | 323 | 61 | 83 | 91 |
| Example 5 | 0.22 | 23 | 510 | 309 | 63 | 83 | 91 |
| Example 6 | 0.15 | 8.9 | 437 | 330 | 80 | 82 | 92 |
| Example 7 | 0.17 | 2.5 | 798 | 330 | 76 | 85 | 91 |
| Comparative Example 1 | 0.03 | less than 0.25* | 1,226 | 332 | 70 | 81 | 76 |

*Although the number of fields of view was increased to 400, the specific pore was observed in 0 field.

As can be seen from the graph (FIG. 4) on which the accumulated pore volume for the pore diameter is plotted with respect to the carbon material in Examples 1 to 4 and Comparative Example 1, it is apparent that the materials of Example 1 (solid line), Example 2 (dashed-dotted line), Example 3 (chain line) and Example 4 (two-dot chain line) have a larger pore volume against a small pore diameter compared to the material of Comparative Example 1 (broken line). As a result, the graphite materials in Examples 1 to 4 enables high-rate discharging and are useful for the secondary batteries in use for the devices requiring a large current.

INDUSTRIAL APPLICABILITY

The graphite material and the battery or secondary battery of the present invention have applicability in the field where conventional lead secondary batteries, nickel-cadmium secondary batteries and nickel-hydrogen secondary batteries were mainly used: e.g. electric tools such as an electric drill, hybrid electric vehicles (HEV) and electric vehicles (EV).

The invention claimed is:

1. A graphite material having pores, wherein an aperture of the pores is in a shape having a diameter of 15 nm to 200 nm, a circularity degree of 0.75 to 1.0 and a major axis/minor axis ratio of 1.0 to 1.5.

2. The graphite material as claimed in claim 1, wherein, in the surface of the graphite material appearing in 200 rectangular regions of 6 μm×8 μm that are randomly selected in a surface image of the graphite material observed by a scanning electron microscope, a pore appearing on the surface and having an aperture in a shape having a diameter of 15 nm to 200 nm, a circularity degree of 0.75 to 1.0 and a major axis/minor axis ratio of 1.0 to 1.5 is visible in two or more regions.

3. The graphite material as claimed in claim 1, wherein the pores are cylindrical.

4. The graphite material as claimed in claim 1, satisfying the following conditions (a) and (b):
(a) a total pore volume measured by mercury intrusion technique is 0.35 cm3/g to 0.65 cm3/g;
(b) an accumulated volume of the pores having a diameter of 3 μm or less as measured by mercury intrusion technique is 0.18 cm3/g to 0.60 cm3/g.

5. The graphite material as claimed in claim 4, wherein $D50/P_{DAVE}$ of the graphite material is 1.5 to 13, D50 representing an average particle diameter based on a volume measured in a solvent using a laser diffraction type particle size distribution analyzer and $P_{DAVE}$ representing an average pore diameter measured by mercury intrusion technique.

6. The graphite material as claimed in claim 1, having a BET specific surface area of 0.4 $m^2/g$ to 5 $m^2/g$.

7. The graphite material as claimed in claim 1, having an average particle diameter based on a volume (D50) measured in a solvent using a laser diffraction type particle size distribution analyzer of 3 μm to 30 μm.

8. The graphite material as claimed in claim 1, having an average interplanar spacing $d_{002}$ of plane (002) of 0.3356 nm to 0.3375 nm measured by a powder X-ray diffraction method and an intensity ratio $I_D/I_G$ (R value) between a peak intensity ($I_D$) in a range of 1300 to 1400 $cm^{-1}$ and a peak intensity ($I_G$) in a range of 1580 to 1620 $cm^{-1}$ as measured by Raman spectroscopy spectra of 0.05 or higher.

9. A carbon material for battery electrodes comprising the graphite material claimed in claim 1.

10. The carbon material for battery electrodes as claimed in claim 9, comprising 100 parts by mass of a graphite material having pores and 0.01 to 200 parts by mass of natural or artificial graphite having an average interplanar spacing (d002) of 0.3370 nm or less, wherein an aperture of the pores is in a shape having a diameter of 15 nm to 200 nm, a circularity degree of 0.75 to 1.0 and a major axis/minor axis ratio of 1.0 to 1.5.

11. The carbon material for battery electrodes as claimed in claim 9, comprising 100 parts by mass of a graphite material having pores and 0.01 to 120 parts by mass of spherical natural graphite or artificial graphite having an average interplanar spacing (d002) of 0.3370 or less and an aspect ratio of 2 to 100, wherein an aperture of the pores is in a shape having a diameter of 15 nm to 200 nm, a circularity degree of 0.75 to 1.0 and a major axis/minor axis ratio of 1.0 to 1.5.

12. A paste for electrodes comprising the carbon material for battery electrodes as claimed in claim 9 and a binder.

13. An electrode comprising a molded body of the paste for electrodes as claimed in claim 12.

14. A battery comprising the electrode as claimed in claim 13 as a constituent.

15. A lithium ion secondary battery comprising the electrode claimed in claim 13 as a constituent.

16. The lithium ion secondary battery as claimed in claim 15, comprising one or both of a non-aqueous electrolyte and a non-aqueous polymer electrolyte, wherein a non-aqueous solvent of the non-aqueous electrolyte and the non-aqueous polymer electrolyte is at least one member selected from the group consisting of ethylene carbonate, diethyl carbonate, dimethyl carbonate, methyl ethyl carbonate, propylene carbonate, butylene carbonate, γ-butyrolactone and vinylene carbonate.

17. The graphite material as claimed in claim 4, wherein a SBET/SHG of the graphite material is 0.65 to 1.5, SGH representing a specific surface area measured by a mercury intrusion technique and SBET representing a specific surface area measured by a BET method.

* * * * *